(12) United States Patent
Sulatisky et al.

(10) Patent No.: US 6,758,233 B2
(45) Date of Patent: Jul. 6, 2004

(54) HIGH VOLUME ELECTRONIC GAS REGULATOR

(75) Inventors: Michael Sulatisky, Saskatoon (CA); Sheldon Hill, Saskatoon (CA)

(73) Assignee: Saskatchewan Research Council, Saskatchewan (CA)

( * ) Notice: Subject to any disclaimer, the term of this patent is extended or adjusted under 35 U.S.C. 154(b) by 0 days.

(21) Appl. No.: 10/203,282

(22) PCT Filed: Jan. 31, 2001

(86) PCT No.: PCT/CA01/00079

§ 371 (c)(1),
(2), (4) Date: Feb. 4, 2003

(87) PCT Pub. No.: WO01/59537

PCT Pub. Date: Aug. 16, 2001

(65) Prior Publication Data

US 2003/0168101 A1 Sep. 11, 2003

(30) Foreign Application Priority Data

Feb. 9, 2000 (CA) ............................................. 2298324

(51) Int. Cl.⁷ ............................................. G05D 16/20
(52) U.S. Cl. ...................... 137/14; 137/102; 137/487.5; 137/613; 251/30.01
(58) Field of Search ...................... 137/14, 102, 115.13, 137/115.23, 115.25, 116.3, 456, 487.5, 613, 495; 251/129.05, 30.01

(56) References Cited

U.S. PATENT DOCUMENTS

| | | | | |
|---|---|---|---|---|
| 2,984,251 A | * | 5/1961 | Quinby .................... | 137/116.3 |
| 3,858,598 A | * | 1/1975 | Carman et al. ............. | 137/102 |
| 4,565,209 A | * | 1/1986 | Ruchser et al. .......... | 137/116.3 |
| 4,766,921 A | * | 8/1988 | Williams ........................ | 137/1 |
| 5,050,634 A | * | 9/1991 | Fiechtner .................... | 137/486 |
| 5,253,669 A | * | 10/1993 | Gray ........................... | 137/14 |
| 5,474,054 A | | 12/1995 | Povinger et al. | |
| 5,762,102 A | * | 6/1998 | Rimboym ................ | 137/492.5 |
| 6,003,543 A | | 12/1999 | Sulatisky et al. | |
| 6,305,401 B1 | * | 10/2001 | Uehara et al. .............. | 137/102 |
| 6,576,361 B1 | * | 6/2003 | Barton ........................ | 429/25 |

FOREIGN PATENT DOCUMENTS

| | | | |
|---|---|---|---|
| DE | 3221 441 | | 12/1983 |
| GB | 2 121 563 A | * | 12/1983 |
| GB | 2 316 773 A | * | 3/1998 |
| WO | WO 98/35279 | * | 8/1998 |

\* cited by examiner

*Primary Examiner*—Ramesh Krishnamurthy
(74) *Attorney, Agent, or Firm*—Ryan W. Dupuis; Adrian D. Battison; Michael R. Williams

(57) ABSTRACT

A gas regulator (14) is provided for regulating the pressure of a gas flowing from a source (12) of the gas under pressure to a device (24) for using the gas. The regulator (14) includes a housing (26) and a pressure reducing valve (36) in the housing for controlling the flow of gas from an inlet (28) under pressure to an outlet (32) at a regulated pressure. The pressure reducing valve is controlled by a pressure responsive member (40, 44) which is displaced by operating feed and bleed valves (50) coupled to a control chamber (46) of the pressure responsive member. The feed and bleed valves are operated by a high speed solenoid actuator (68). The bleed valve is vented to the outlet of the housing from the control chamber which is maintained at a higher pressure. The high speed solenoid actuator (68) is operated by a controller (18) for controllably varying the output pressure as desired.

15 Claims, 13 Drawing Sheets

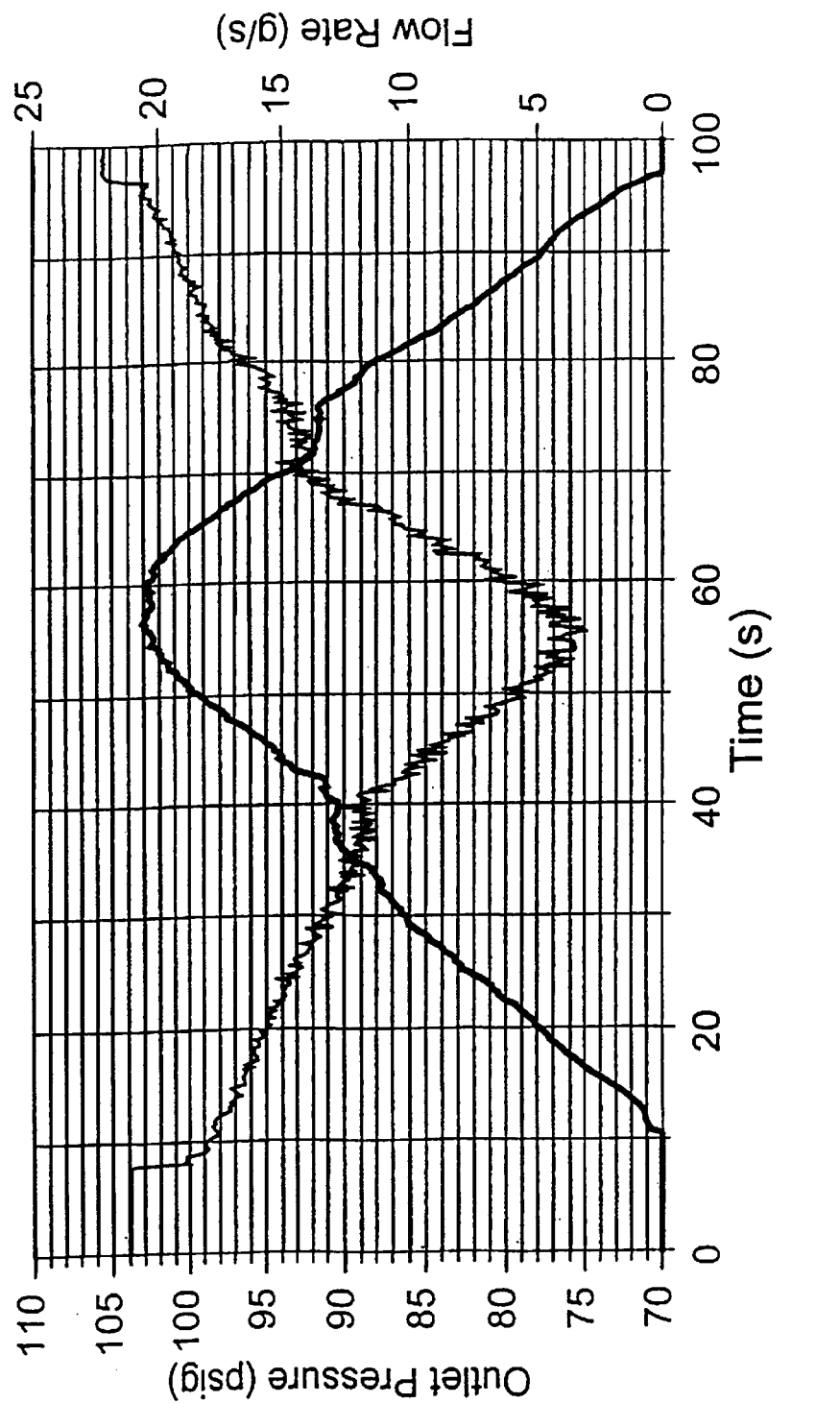
Figure 5 : Flow Variation at 1000 psig
Single-Stage Mechanical Regulator

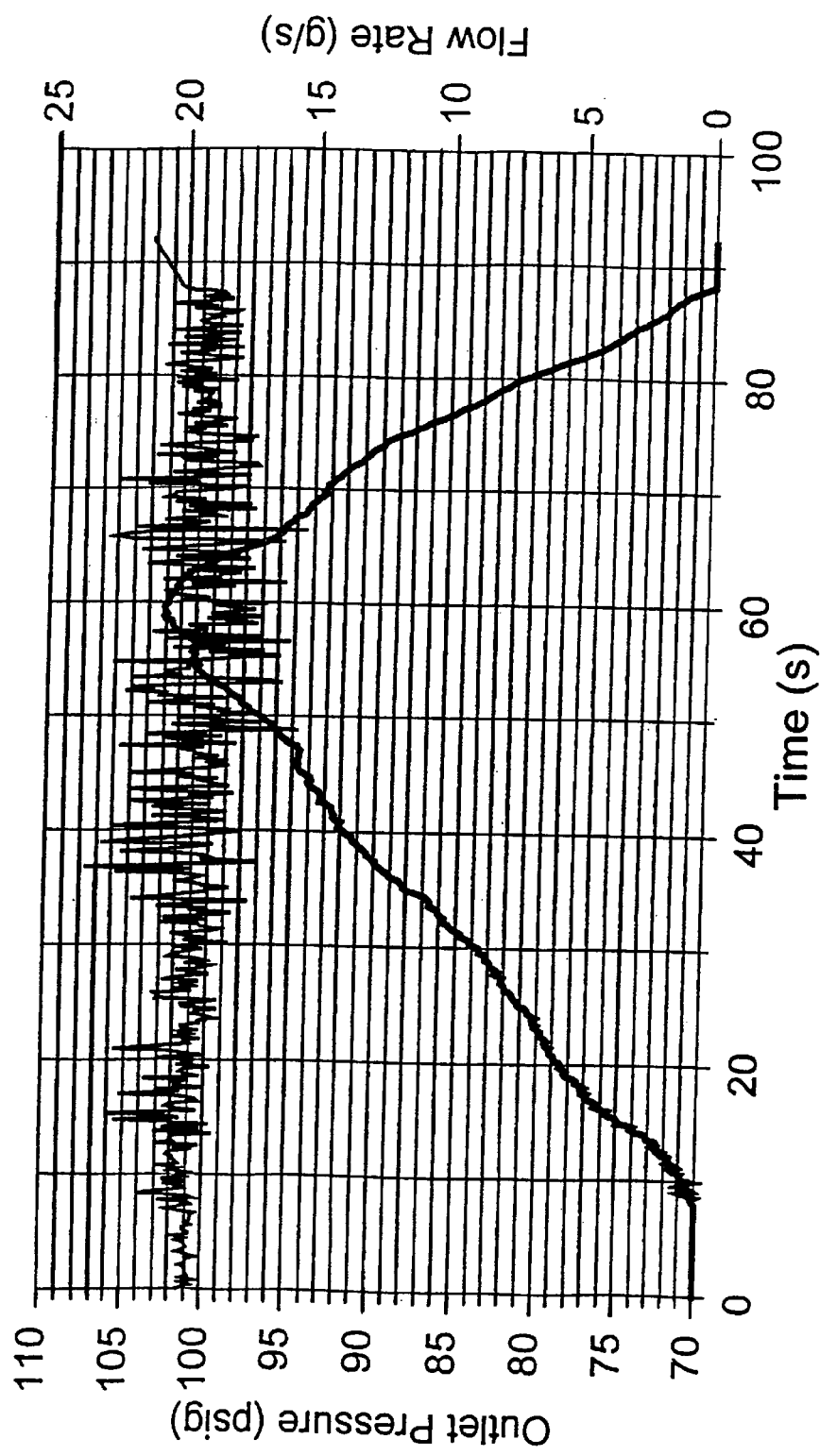
Figure 6 : Flow Variation at 1000 psi
Electronic Regulator, 3 ft hose

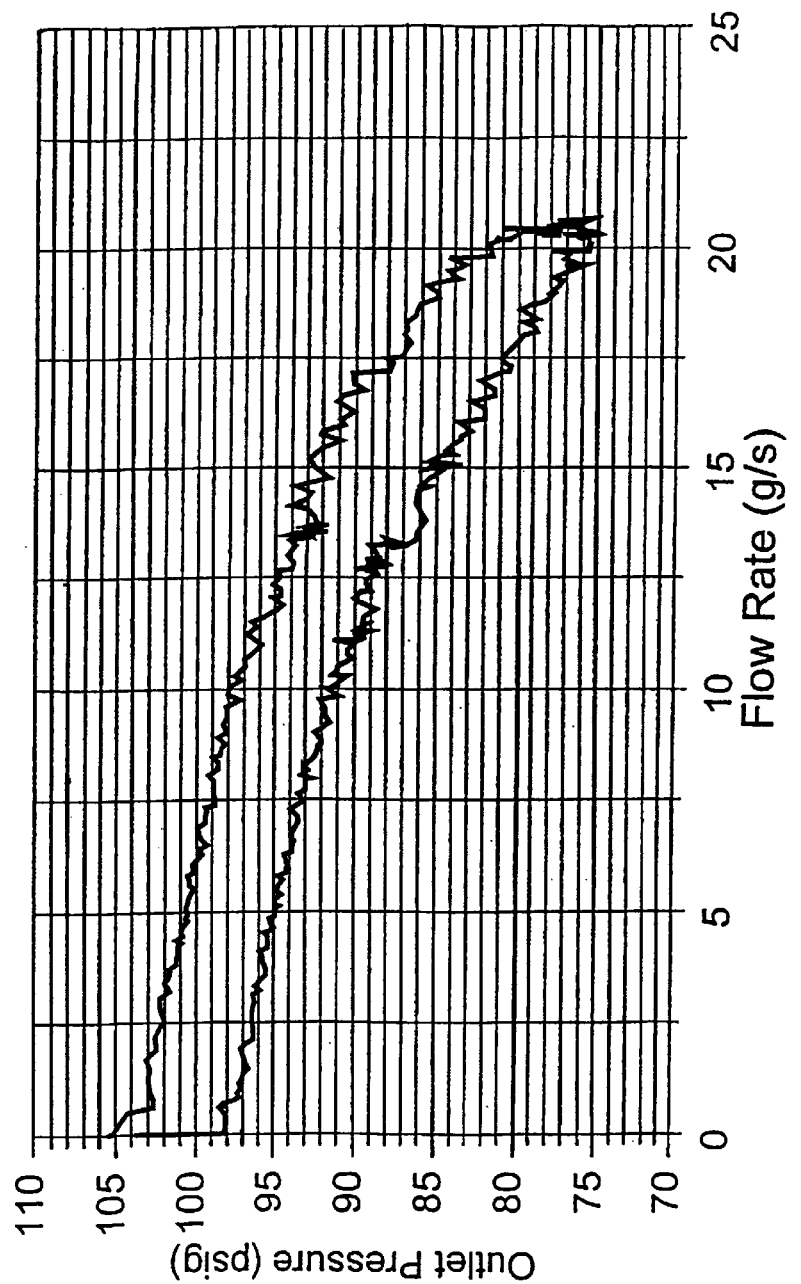
Figure 7 : Flow Variation at 1000 psig
Single-Stage Mechanical Regulator

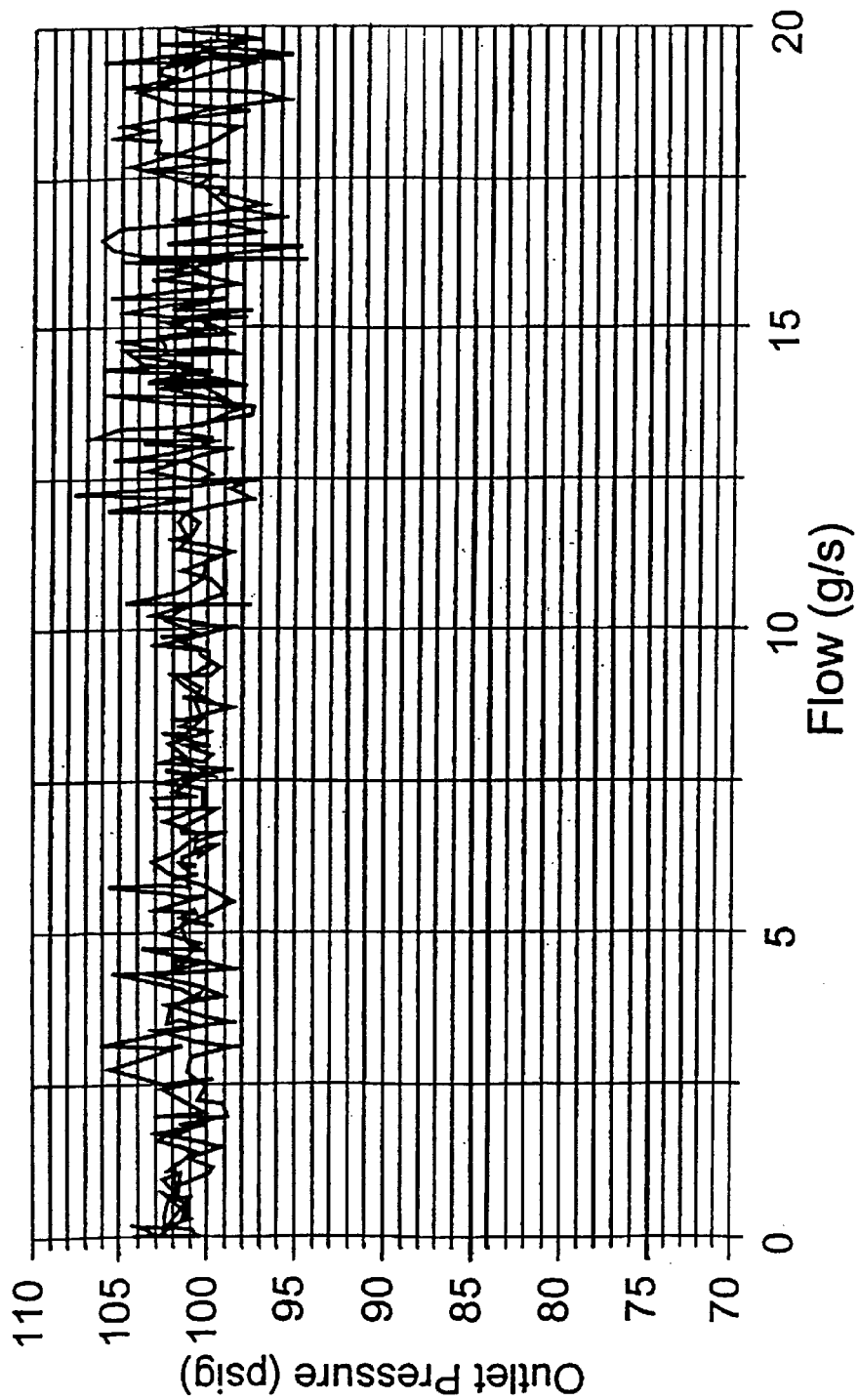
Figure 8: Flow Variation at 1000 psig
Electronic Regulator

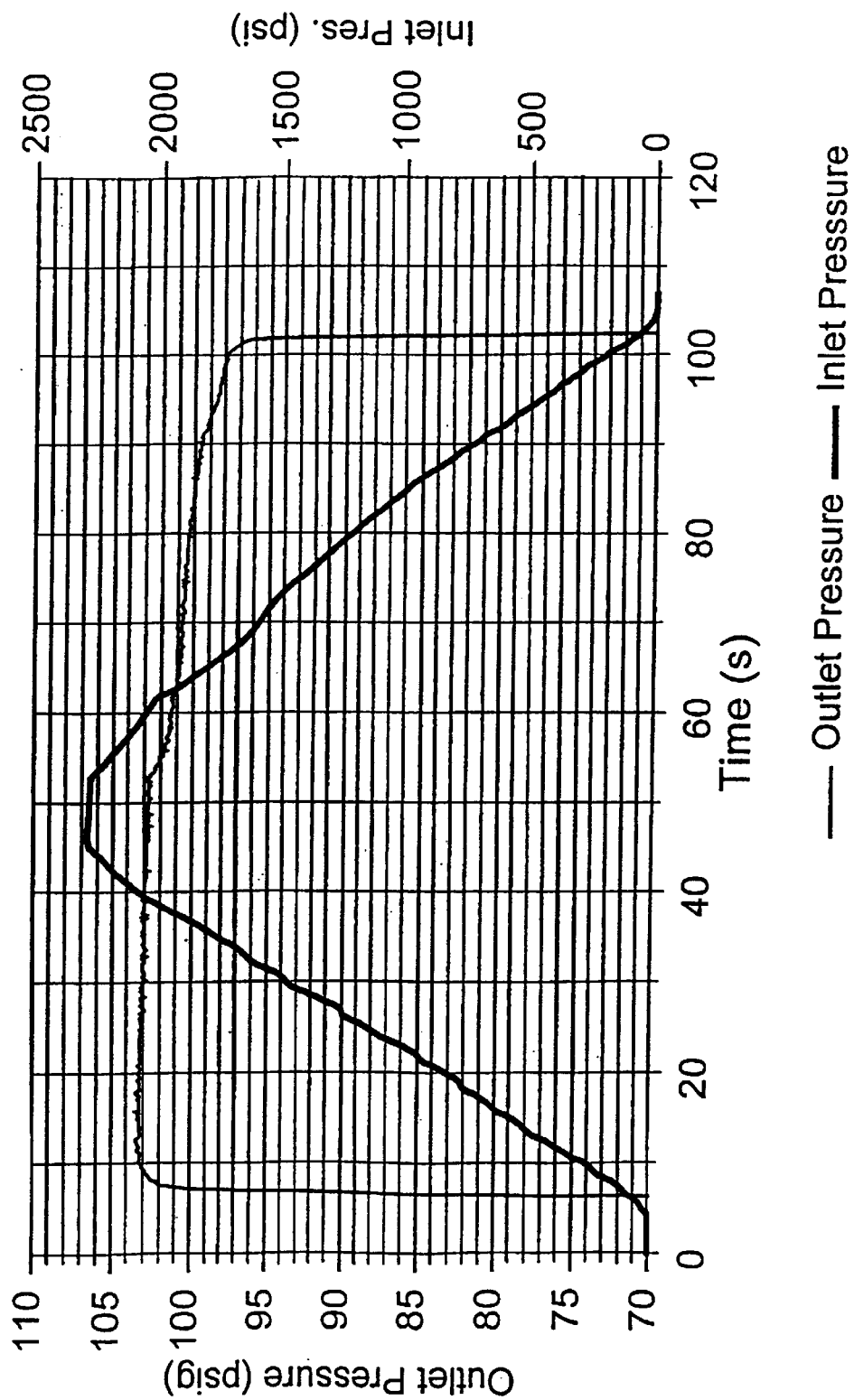
Figure 9: Tank Pressure Effect
Single-Stage Regulator at 1 g/s

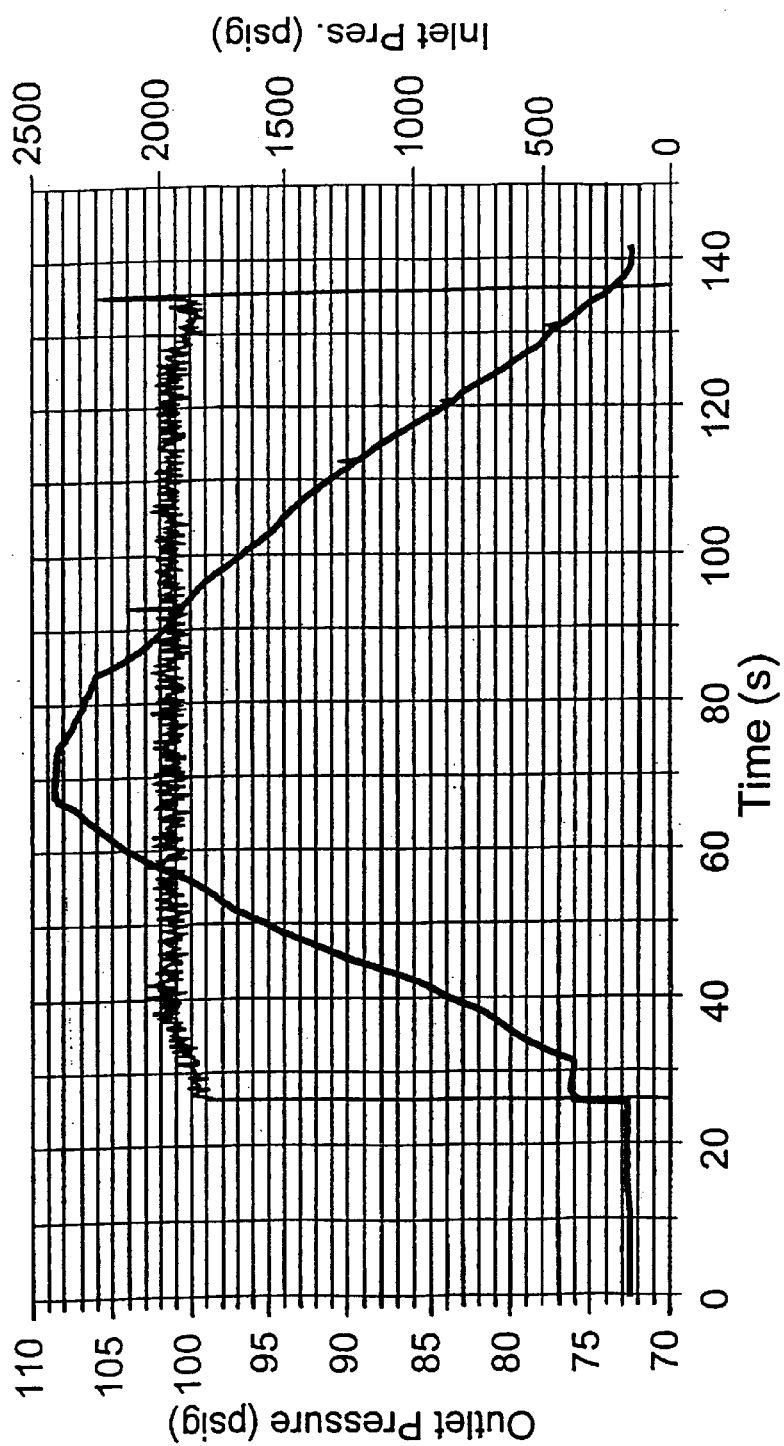
Figure 10 : Tank Pressure Effect
Electronic Regulator at 1 g/s

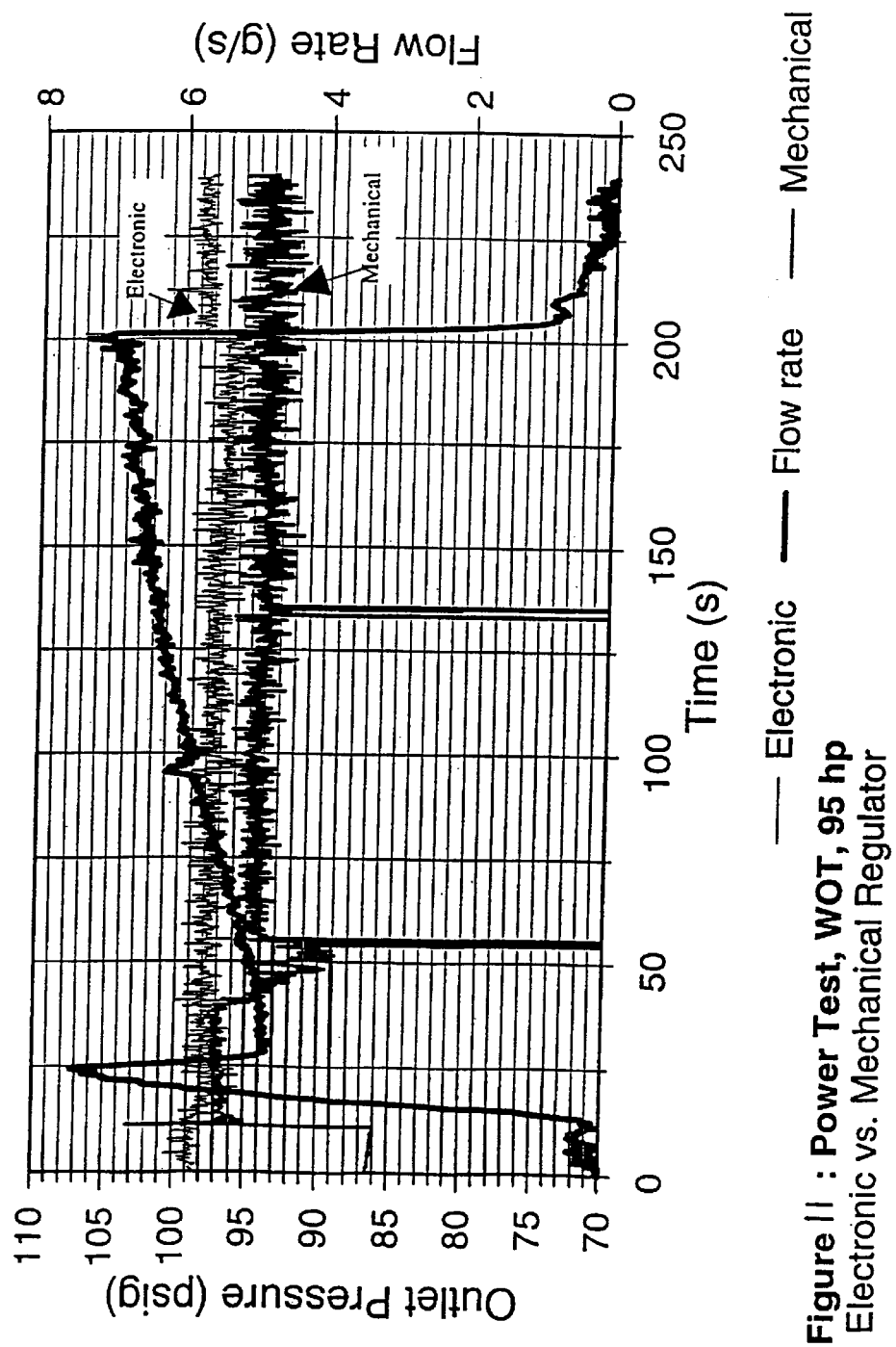
Figure 11: Power Test, WOT, 95 hp
Electronic vs. Mechanical Regulator

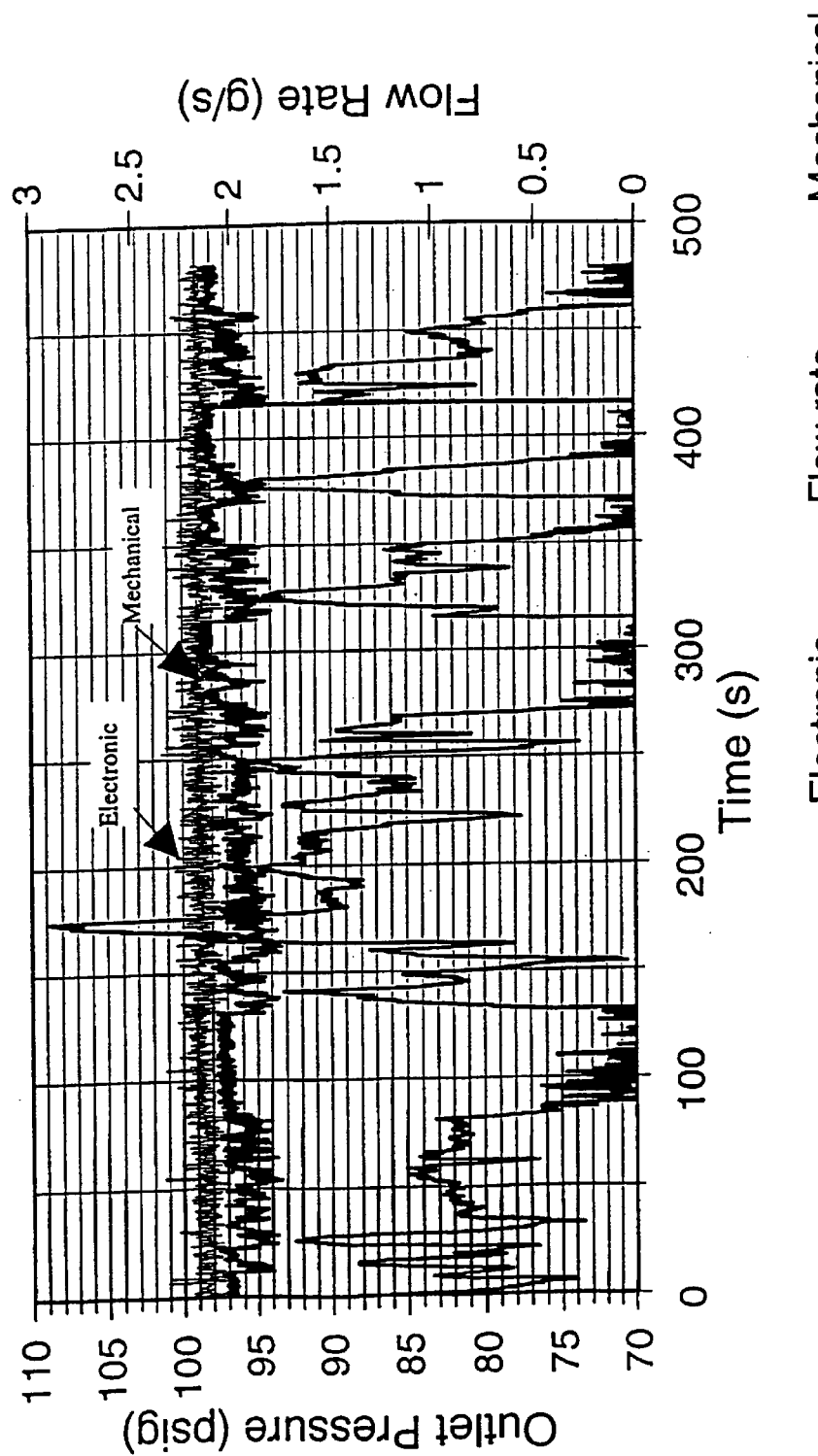
Figure 12: Electronic Regulator
FTP-75 (505)

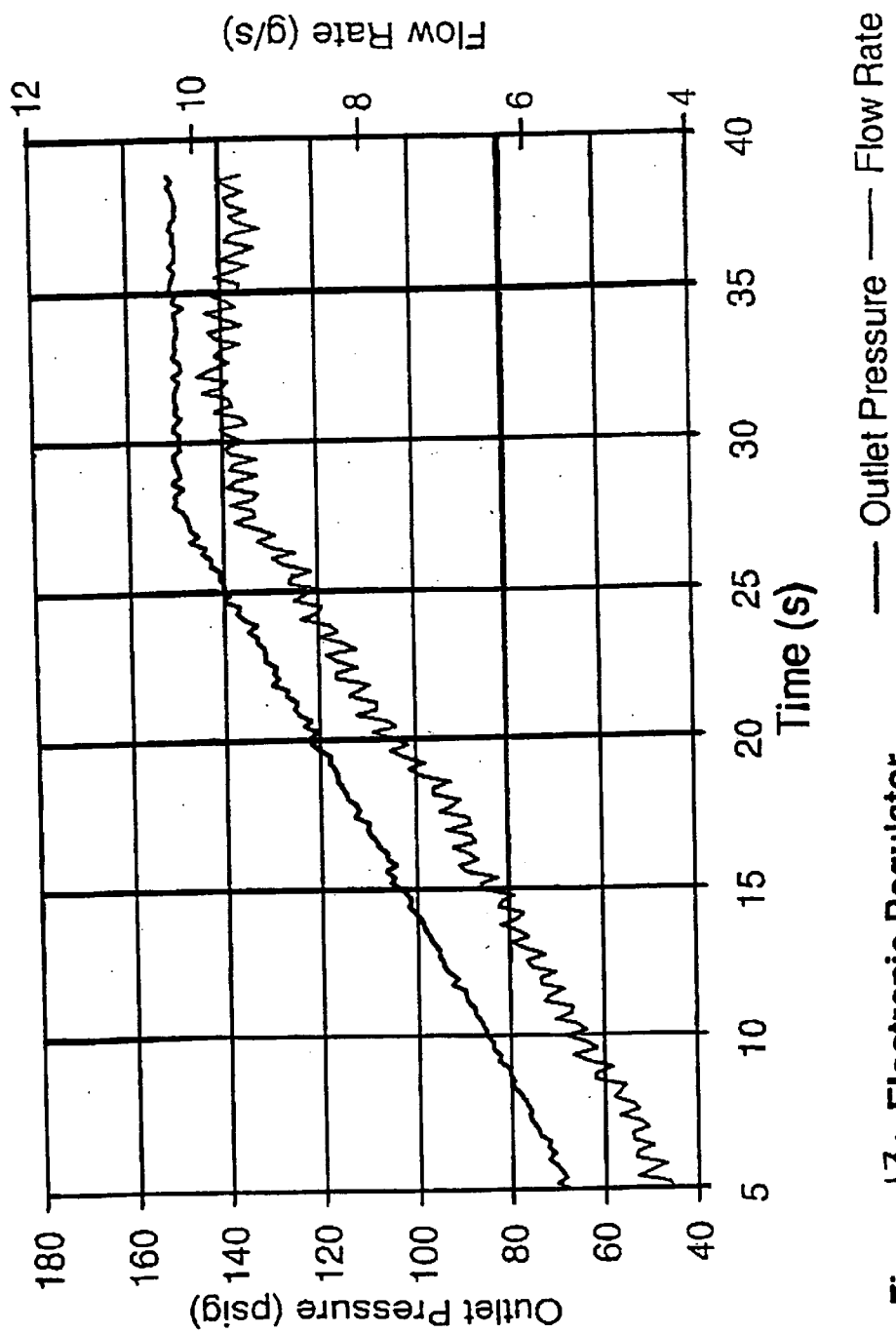
Figure 13: Electronic Regulator
Ramp Change in Set-Point Pressure

HIGH VOLUME ELECTRONIC GAS REGULATOR

FIELD OF THE INVENTION

The present invention relates to gas pressure regulators and more particularly to regulators for regulating pressure in large volume, highly dynamic flows of gas.

BACKGROUND

One of the technical challenges facing the natural gas vehicle (NGV) industry, and other pressurised gas using devices, is the need for an accurate, reliable pressure regulator to supply gas to the system. Currently, mechanical (analogue) regulators are being used that have inherent errors due to dynamic droop, hysteresis, and supply-pressure effects. These are single-stage or two-stage designs that use either a diaphragm or a piston coupled to a valve to control pressure. Durability has been a problem with a number of regulators. Some regulators have been prone to failures of the valve-seat, diaphragm, and o-rings. Others have been reported to jam or stick in the open position, or resonate (squawking, honking).

To address these concerns an electronic regulator has been developed that is controlled by a proportional-integral-derivative (PID) controller. This regulator is described in U.S. Pat. No. 6,003,543, filed Jun. 11, 1997, the disclosure of which is incorporated herein by reference. The regulator includes a high-speed solenoid valve, a pressure sensor, and an electronic control unit. This regulator can significantly improve the accuracy of the injector supply pressure by reducing droop (steady-state error), hysteresis, and the error due to changes in storage tank pressure. However, this system at present can only meet the fuel flow requirements of smaller engines.

U.S. Pat. No. 3,455,323 to Haupt, provides a gas regulator using electronic pressure control. The regulator includes a housing having an inlet, an outlet and a regulator valve for controlling flow through the housing from the inlet to the outlet. A pressure responsive member supported in a control chamber within the housing controls displacement of the regulator valve. The control of pressure in the control chamber however requires multiple valves each having a solenoid to control the bleeding and feeding of the control pressure in the control chamber therethrough. The arrangement of valves and solenoids is complex to assemble upon manufacture and requires awkward manipulation in use. Furthermore, the valves are arranged to be vented to the atmosphere when bleeding gas from the control chamber which is undesirable when the gas to be regulated involves fuels and the like which are typically not friendly to the environment.

British Patent Application 2 121 563 provides a pressure regulating apparatus for gaseous and liquid flow media. The apparatus includes a housing having an inlet, an outlet and a regulator valve controlled by a pressure responsive member mounted in a control chamber similarly to the above noted U.S. patent to Haupt. Control of the pressure in the control chamber however requires a complex arrangement of ports and valves for selectively feeding or bleeding the control chamber on both sides of the pressure responsive member. Furthermore, bleeding of the control chamber on both sides of the pressure responsive member requires venting externally of the housing. This is undesirable as noted above when regulating pressure of fuels and the like which should not be vented to the atmosphere.

The present invention is concerned with certain improvements to gas regulators for large volume, highly dynamic flows of gas which address some of the deficiencies of the above noted prior art.

SUMMARY

According to one aspect of the present invention there is provided a gas pressure regulator for regulating the pressure of a gas flowing from a source of the gas under pressure to a device for using the gas, the regulator comprising:

a regulator housing having a gas inlet for receiving the gas and a gas outlet for the delivery of the gas from the housing;

a pressure reducing valve in the housing for controlling the flow of gas from the inlet to the outlet;

a pressure reducing valve controller comprising:

a control chamber;

a feed valve having an inlet for receiving gas from said source of gas under pressure and a control pressure outlet coupled to the control chamber, the feed valve having an open state in which the valve is fully open and a closed state in which the valve is fully closed;

a bleed valve having an inlet coupled to the control chamber and an outlet coupled to the gas outlet of the regulator housing, the bleed valve having open state in which the valve is fully open and a closed state in which the valve is fully closed;

a high speed solenoid valve actuator for operating the feed and bleed valves;

a pressure responsive member in the control chamber and coupled to the pressure reducing valve for movement therewith, the pressure responsive member being movable in response to variations in a control pressure in the control chamber;

a pressure monitor for monitoring an actual gas pressure at the gas outlet of the regulator housing;

a controller coupled to the pressure monitor and to the solenoid valve actuator for controlling operation of the feed and bleed valves between their respective closed and open states to produce a desired gas pressure at the gas outlet of the regulator housing.

The regulator of the present invention provides an effective means of regulating pressure of large volume, highly dynamic flows of gas using a pressure reducing valve which is simple in design and use. The arrangement of the bleed valve is particularly useful for ensuring that gaseous fuels being regulated are not vented to the atmosphere, but rather are vented to the outlet of the regulator where the fuel can be subsequently consumed with the pressure regulated gaseous fuel exiting the regulator.

This regulator is of the piston or diaphragm type, with the pressure responsive member, e.g. piston or diaphragm, moving in response to a pressure difference across the member, and controlling the pressure reducing valve. In this case, the control pressure is supplied by the gas being regulated, under the control of feed and bleed valves. This allows the rapid regulation of the supply pressure with a limited energy input. The back pressure is the outlet pressure.

To adjust the regulator in response to a reduced gas or fuel demand, the control chamber pressure must be reduced using the bleed valve. Because the control gas may be gaseous fuel, it is not acceptable to bleed this gas into the atmosphere, so that the gas used for control is bled from the control chamber into the gas outlet of the regulator housing to be used as fuel.

The use of a high speed solenoid actuator for the feed and bleed valves allows the same kind of dynamic control of the control pressure that can be achieved with the pressure control system disclosed in prior U.S. Pat. No. 6,003,543, referred to above, but for much larger flow rates.

The solenoid valve actuator may be a single solenoid coil opening and closing the feed and bleed valves in opposition. Pulse width modulation and/or frequency modulation may be used to vary the ratio of open and closed times and thus the pressure in the control chamber. Alternatively, two coils may be used for the two valves. This allows independent control of the valves to compensate for inertial effects, for example pressure spikes or time lags in flow changes, in response to rapid changes in flow demand.

The desired gas pressure at the gas outlet is preferably a set point pressure. The controller thus preferably comprises a mechanism for controllably varying the set point pressure.

The controller preferably includes a signal generating mechanism for delivering a pulsed electrical signal for operating the feed and bleed valves and a signal varying mechanism for controllably varying the pulse width of the electrical signal.

The high speed solenoid valve actuator preferably includes a pressure reducing valve closing mechanism for closing the pressure reducing valve in response to deactivation of the high speed solenoid valve actuator. This arrangement provides a positive shut-off for ensuring no gaseous fuel is released from the regulator in the event of a failure or loss of power to the solenoid valve actuator.

In a preferred embodiment, the feed and bleed valves are coupled for movement together between a bleed position in which the bleed valve is in the open state and the feed valve is in the closed state and a feed position in which the feed valve is in the open state and the bleed valve is in the closed state. The high speed solenoid valve actuator would thus preferably comprise a single solenoid coupled to the feed and bleed valves with the feed and bleed valves being positioned in the bleed position upon deactivation of the single solenoid.

The feed and bleed valves are preferably both coupled to communicate with the control chamber on a first side of the pressure responsive member. A port may then be provided coupling the control chamber on a second side of the pressure responsive member to the gas outlet of the regulator housing such that back pressure on the second side of the pressure responsive member is substantially equal to the actual gas pressure at the gas outlet. A biasing mechanism may additionally be provided on the second side of the pressure responsive member acting in a direction corresponding to closing the pressure reducing valve.

There may be provided a shut-off valve coupled to the gas inlet of the regulator housing. When closed, the shut-off valve ensures that the gaseous fuel is not leaked through the regulator housing when the device using the pressure regulated gas is not intended to be used.

The shut-off valve may include a solenoid operating mechanism for displacing the valve between respective open and closed positions. The solenoid operating mechanism is preferably arranged to be oriented in the closed position when de-energised to ensure that it operates as it is intended, for closing the flow of gaseous fuel in the event of a power loss or failure. The shut-off valve is preferably arranged to be closed in response to a shut-off condition sensed by the pressure monitor which may include a signal from the device using the gas that it is being shut-off or a signal from the controller indicating a failure.

According to a second aspect of the present invention there is provided in combination:

a supply of pressurised gas;

a gas using device for using the gas; and a gas pressure regulator coupled to the gas using device and the supply of pressurised gas for controlling the pressure of gas delivered from the supply to the gas using device, said pressure regulator comprising:

a regulator housing having a gas inlet for receiving the gas and a gas outlet for the delivery of the gas from the housing;

a pressure reducing valve in the housing for controlling the flow of gas from the inlet to the outlet;

a pressure reducing valve controller comprising:

a control chamber;

a feed valve having an inlet for receiving gas from said source of gas under pressure and a control pressure outlet coupled to the control chamber, the feed valve having an open state in which the valve is fully open and a closed state in which the valve is fully closed;

a bleed valve having an inlet coupled to the control chamber and an outlet coupled to the gas outlet of the regulator housing, the bleed valve having open state in which the valve is fully open and a closed state in which the valve is fully closed;

a high speed solenoid valve actuator for operating the feed and bleed valves;

a pressure responsive member in the control chamber and coupled to the pressure reducing valve for movement therewith, the pressure responsive member being movable in response to variations in a control pressure in the control chamber;

a pressure monitor for monitoring an actual gas pressure at the gas outlet of the regulator housing;

a controller coupled to the pressure monitor and to the solenoid valve actuator for controlling operation of the feed and bleed valves between their respective closed and open states to produce a desired gas pressure at the gas outlet of the regulator housing.

In a gas using system, when the supply of pressurised gas is mounted remotely from the gas using device, coupled by a gas line, the gas pressure regulator is preferably mounted adjacent the supply of pressurised gas. The pressure monitor is then preferably coupled to the gas line adjacent the gas using device so that the gas line coupling the supply to the gas using device is at the regulated pressure instead of the much greater supply pressure. This is particularly useful in a gaseous fuelled vehicle wherein the fuel lines coupling the pressurised gaseous fuel tank to the engine can be maintained at the regulated pressure instead of the supply pressure of the fuel tank while still being able to accommodate the varying pressure requirements of fuel to be delivered to the engine.

The regulator according to the present invention may be incorporated into various gaseous fuelled devices or gas consuming systems, including the following:

1) as a stand alone regulator coupled within the gas line at any location between a supply and a gas using device;

2) as a regulator integrated with a tank valve and a tank solenoid to produce one component;

3) as a regulator for vehicles with gaseous fuelled combustion engines including natural gas fuelled vehicles (NGVs) and the like; and 4) as a regulator for vehicles with fuel cell powered engines for regulating fuel supplied to the fuel cell of the vehicle.

According to a further aspect according to the present invention there is provided a method of regulating pressure of a gas flowing from a source under pressure to a device for using the gas, the method comprising:

providing a regulator housing having a gas inlet, a gas outlet and a pressure reducing valve for controlling the flow of gas from the inlet to the outlet;

connecting the gas inlet in communication with the source under pressure;

connecting the gas outlet in communication the device for using the gas;

providing a pressure reducing valve controller having a control chamber, a feed valve and a bleed valve, each of the feed and bleed valves having an open state in which the valve is fully open and a closed state in which the valve is fully closed;

connecting the feed valve to the source under pressure at an inlet of the feed valve and to the control chamber at an outlet of the feed valve;

connecting the bleed valve to the control chamber at an inlet of the bleed valve and to the gas outlet of the regulator housing at an outlet of the bleed valve;

providing a pressure responsive member in the control chamber;

coupling the pressure responsive member to the pressure reducing valve for movement therewith in response to variations in control pressure in the control chamber;

monitoring an actual gas pressure at the gas outlet of the regulator housing; and controlling, in response to the actual gas pressure monitored, operation of the feed and bleed valves between their respective closed and open states to produce a desired gas pressure at the gas outlet of the regulator housing.

The operation of controlling the bleed valve preferably includes venting the control chamber to the gas outlet of the regulator housing.

The control pressure in the control chamber is preferably maintained substantially greater than the actual gas pressure at the gas outlet of the regulator housing.

While the invention has been developed with a view to its application in gaseous fuelled vehicles, electronic regulators can also be used as stand-alone regulators in other applications.

BRIEF DESCRIPTION OF THE DRAWINGS

In the accompanying drawings, which illustrate exemplary embodiments of the present invention and graphs representing certain test data:

FIG. 5 is a graph showing the variations in outlet pressure and flow rate with time in a single stage mechanical regulator;

FIG. 6 is a graph like FIG. 5 for an electronic regulator according to the present invention;

FIG. 7 is a graph showing the variation of outlet pressure with flow rate in a single stage mechanical regulator;

FIG. 8 is a graph like FIG. 7 for an electronic regulator according to the present invention;

FIG. 9 is a graph showing the variation of outlet pressure with changes in inlet pressure over time with a single stage mechanical regulator;

FIG. 10 is a graph like FIG. 9 for an electronic regulator according to the present invention;

FIG. 11 is a comparative plot of the results of power tests on a vehicle;

FIG. 12 is a comparative plot of the results from part of a standard test procedure; and FIG. 13 is a graph showing the variation of outlet pressure of the electronic regulator with a ramp change in set point pressure.

DETAILED DESCRIPTION

Figure 1:
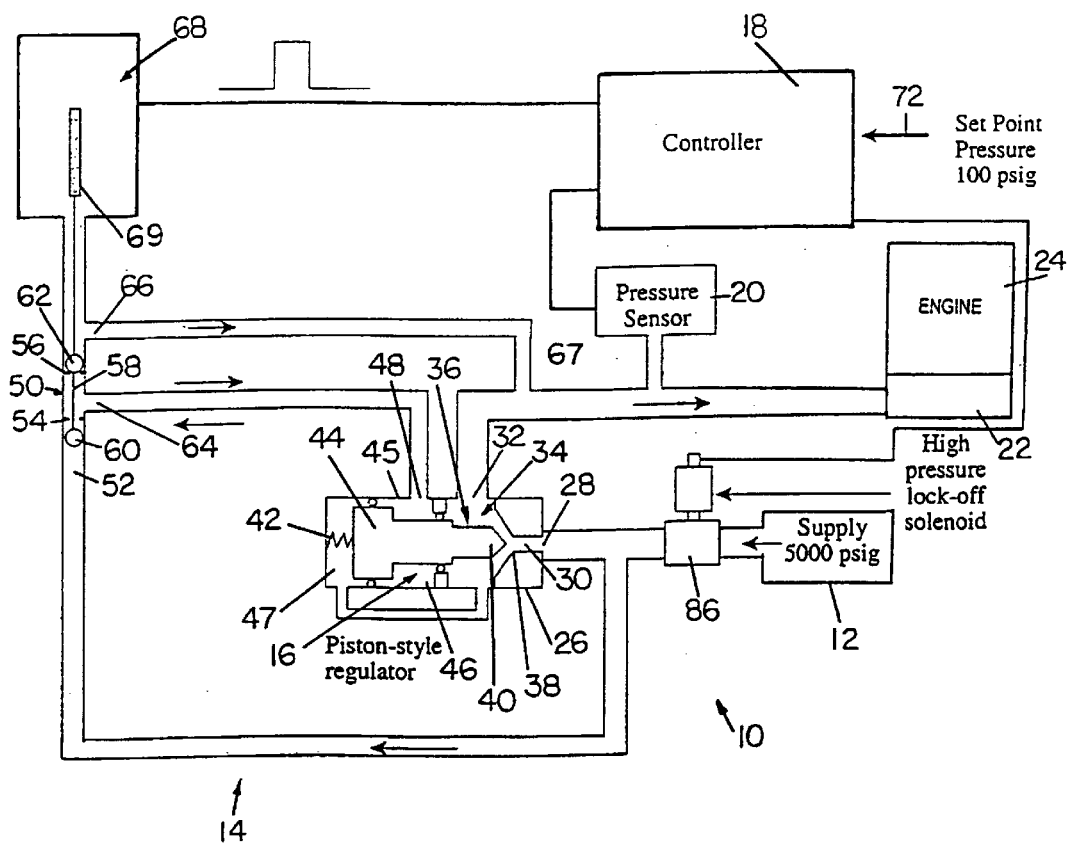
FIG. 1 is a schematic illustration of one embodiment of the regulator.

Referring to the accompanying drawings, and particularly to FIG. 1 initially, there is illustrated a gaseous fuel system 10 that includes a fuel supply 12 of pressurized gaseous fuel. Gas from the supply is delivered to a regulator 14. The regulator has an operating component 16 controlled by a processor 18 which receives the feedback from a pressure sensor 20. The regulator delivers gaseous fuel at a regulated pressure to the fuel metering device 22 of a gas using device 24, for example an internal combustion engine.

The regulator 14 includes a regulator housing 26. This has a gas inlet 28 connected to the fuel supply 12 and discharging into an inlet chamber 30 in the housing. The housing also has a gas outlet 32 from an outlet chamber 34 and connected to the fuel metering device 22. Between the inlet chamber 30 and the outlet chamber 34 is a pressure reducing valve 36. The pressure reducing valve 36 includes a pressure reducing valve seat 38 and a pressure reducing valve head 40 that moves towards and away from the seat to vary the size of the opening between the two, thus providing a variable restriction in the flow of gas from the inlet chamber to the outlet chamber. A spring 42 biases the pressure reducing valve head 40 towards engagement with the seat 38.

A piston 44 is coupled to the pressure reducing valve head 40 and reciprocates in a cylindrical chamber 45 in the housing, separating that chamber into an outlet regulated chamber 47 on one side and a closed control chamber 46 on the other. A control port 48 couples the control chamber 46 to an outlet 64 of a three-way valve 50.

The three way valve 50 includes both a feed valve having a feed valve seat 54 and a bleed valve having a bleed valve seat 56. These two valve seats cooperate with a valve body 58 having a feed valve head 60 and a bleed valve head 62 engageable with the seats 54 and 56 respectively. The valve body 58 thus ensures that the feed and bleed valves are operable together between a respective feed position and a respective bleed position of the three way valve 50 in which pressurised gas is either fed or bled from the control chamber 46 through the control port 48.

The feed valve, including the feed valve seat 54 and the feed valve head 60, connects the control port 48 to the pressurised supply 12 through a feed valve inlet 52 for supplying pressurised gas to the control chamber when the feed valve is opened. Alternatively, the bleed valve, including the bleed valve seat 56 and the bleed valve head 62, connects the control port 48 to a bleed port 66 for bleeding pressurised gas from the control chamber when the bleed valve is opened. The bleed port 66 is connected to the gas outlet 32 of the regulator housing at a bleed inlet 67 as indicated in FIG. 1 for bleeding the pressurised gas from the control chamber to the gas outlet of the regulator housing.

The three way valve 50 is controlled by a solenoid operating mechanism 68 with an operating coil 69. In operation, the valve operates between the respective feed and bleed positions. In the feed position, the feed valve is fully open, with the head 60 disengaged from the seat 54 while the bleed valve is fully closed, with the bleed valve head 62 engaged with the valve seat 56. In the bleed position, the feed valve is fully closed by the feed valve head 60 engaging the seat 54, while the bleed valve is fully opened by the bleed valve head 62 being disengaged with the seat 56. The solenoid operating mechanism 68 is operated under the control of the processor 18 using a square wave signal that is pulse width modulated and/or frequency modulated to provide the desired output pressure as detected by the pressure sensor 20.

The controller 18 has a set point input 72 for representing the desired output pressure from the regulator. This can be fixed or variable. This provides a more precise control of engine operation to meet not only fuel demand but emission standards and other parameters. The processor uses a proportional, integral and derivative (PID) control algorithm. The solenoid operating mechanism provides a very accurate control of the pressure in the control chamber which is balanced by the sum of the pressure in the inlet chamber 30 and the force of spring 42. The spring is selected to provide an adequate force to close the pressure reducing valve 36 when the outlet pressure is above the set point, or when the system is inoperative.

Figure 2:
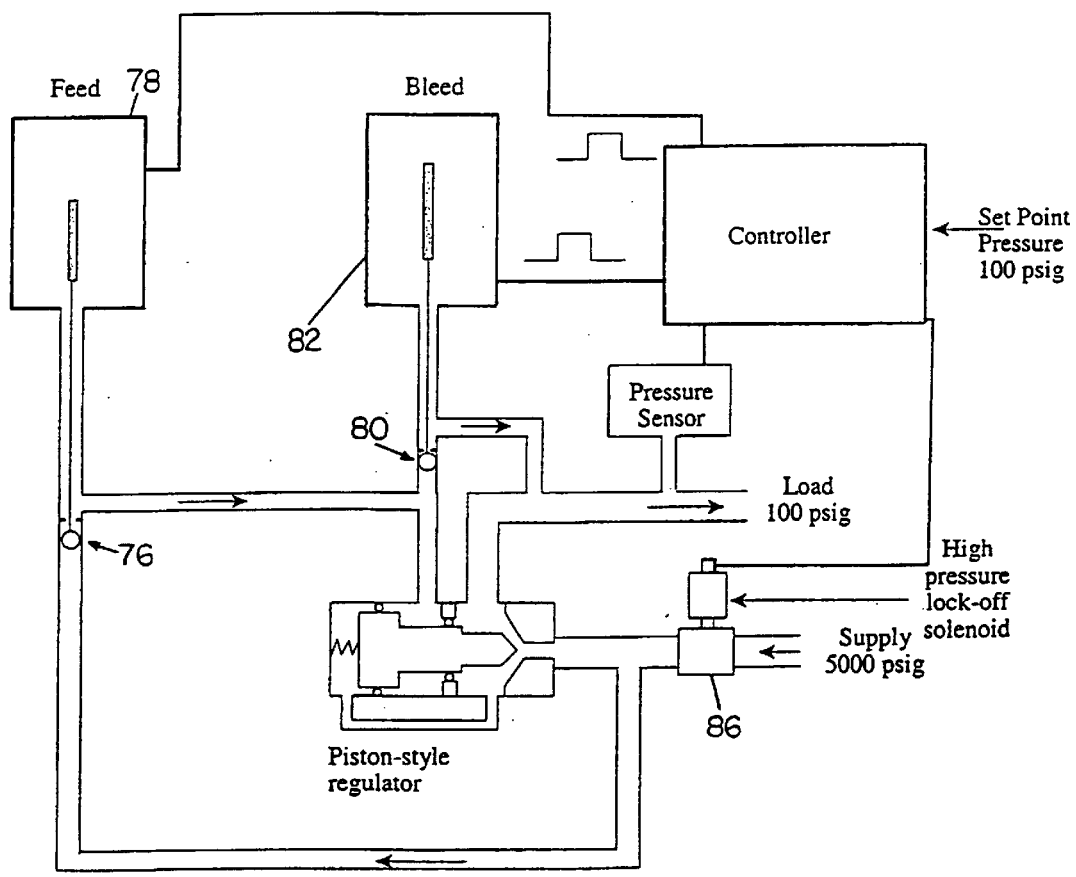
FIG. 2 is a schematic illustration of a second embodiment of the regulator.

An alternative embodiment of the regulator is illustrated in FIG. 2, where the feed and bleed valves are operated by separate high-speed solenoid operating mechanisms. The feed valve 76 includes a solenoid operating mechanism 78, while the bleed valve 80 includes its own solenoid operating mechanism 82. This provides for independent control of the feed and bleed functions. This can be used to improve the bleed rate where the bleed valve 80 has a larger flow area. This has the additional benefit of allowing the dome to be fed, bled or held constant, reducing pressure fluctuation. In terms of hardware, the life of the solenoid operating mechanism is improved because of reduced operation.

Both the first and second embodiments include a high pressure lock-off solenoid 86. The lock-off solenoid 86 is a valve, controllable between a fully open position and a fully closed position by a solenoid operating coil arranged in such a manner that the lock-off solenoid is oriented in the fully closed position when the operating coil is de-energised.

The lock-off solenoid 86 is controlled by the controller 18 for shutting off the gaseous fuel supplied to the regulator in response to shut-off condition as determined by the controller. The shut-off condition comprises a shut-off signal from the controller in the event that the controller detects a failure or receives a signal from the gas using device that the gas using device is turned off. The high pressure lock-off solenoid 86 thus ensures that gaseous fuel is not leaked through the regulator housing when the regulator and gas using device coupled thereto are intended to be shut-off.

Figure 3:
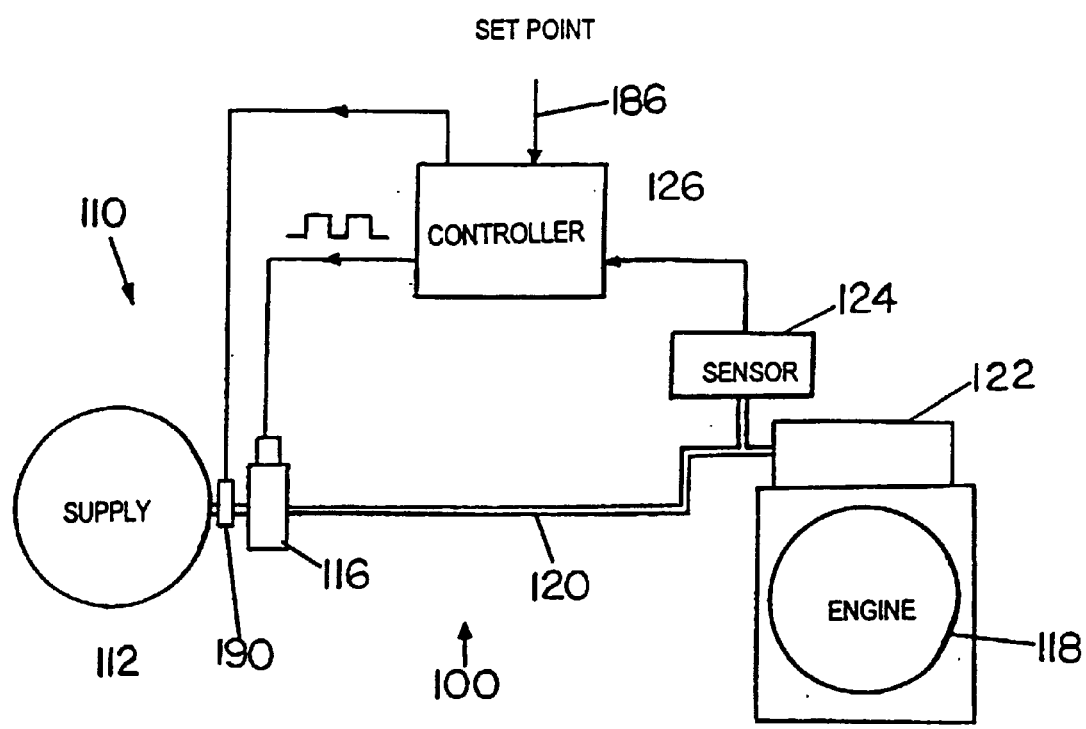
FIG. 3 is a schematic of a further embodiment of the regulator.
Figure 4:
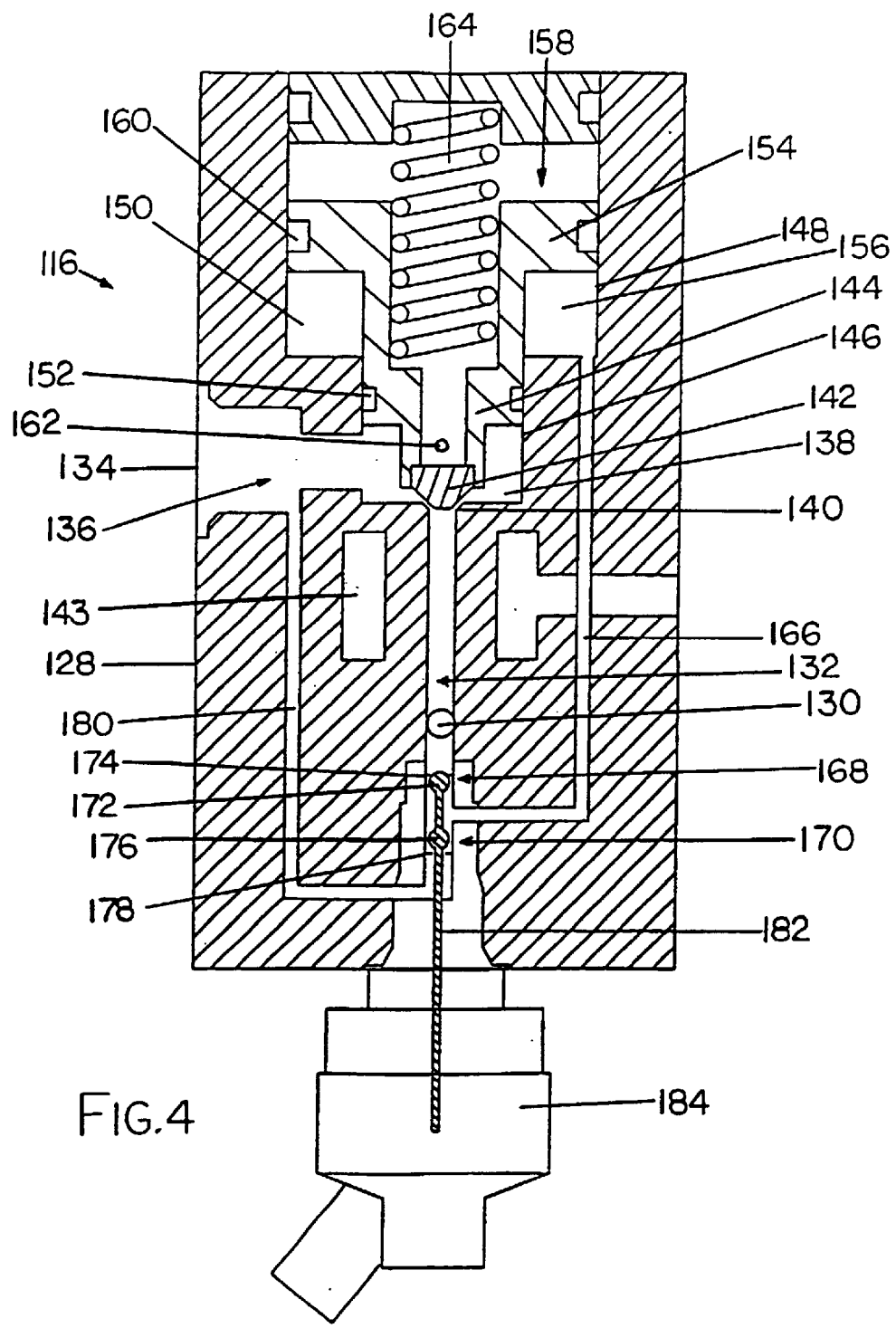
FIG. 4 is a cross-sectional view of the pressure reducing valve of the embodiment of FIG. 3.

Referring now to FIGS. 3 and 4 a further embodiment of the regulator is generally indicated by reference numeral 100. The regulator 100 is intended for use with a gaseous fuel system 110 similar to the previously described systems of FIGS. 1 and 2. The fuel system 110 includes a supply of pressurised gas 112 in a high pressure vessel, typically in the form of a tank, mounting an electronic regulator having an operating component 116 located in, on, or near the high pressure vessel. The supply 112 is mounted remotely from a gas using device 118 arranged to use the gas. The gas using device 118 may comprise a combustion engine, a fuel cell arrangement or any other suitable pressurised gas using device. Gas is delivered from the supply 112 through a pressure reducing valve within the operating component 116 of the regulator to a fuel line 120 at a regulated pressure. The fuel line 120 delivers the gas at the lowered regulated pressure to the fuel metering system 122 of the gas using device 118. A pressure sensor 124 is mounted along the fuel line 120 adjacent the fuel metering system 122 of the gas using device such that the regulator is arranged to regulate the pressure of the flow entering the metering system. The sensor 20 provides feedback to a processor 126 which subsequently controls the operating component 116 of the regulator.

The operating component 116 of the regulator is illustrated in further detail in FIG. 4. A housing 128 of the regulator includes a gas inlet 130 (perpendicular to the plane shown) connected directly to the fuel supply 112 for discharging into an inlet chamber 132 in the housing. A gas outlet 134 is also provided in the housing for discharging gas from an outlet chamber 136 in the housing to the fuel line 120 connected to the gas using device.

A pressure reducing valve 138 is mounted between the inlet and outlet chambers to provide a variable flow restriction to the gas flowing from the inlet chamber to the outlet chamber. The pressure reducing valve 138 includes a pressure reducing valve seat 140 and a pressure reducing valve head 142 movable towards and away from the seat between open and closed positions to vary the size of the opening and thus vary the restriction of flow between the inlet and the outlet.

An optional heating jacket 143 is mounted within the housing 128 to surround the pressure reducing valve 138. The heating jacket 143 heats the area surrounding the valve seat 140 and the inlet of the pressure reducing valve 138 to compensate for the heat which is absorbed by the gaseous fuel as it expands through the pressure reducing valve 138. This is particularly useful when regulating gaseous fuels like natural gas which absorbs a considerable amount of heat from its surroundings upon expansion.

The pressure reducing valve head 142 is mounted on a piston 144 for sliding movement therewith within a bore 146 in the housing. The bore 146 defines a portion of the outlet chamber 136 surrounding the pressure reducing valve head 142. A counter bore 148 of greater diameter than the bore 136 defines the control chamber 150 of the regulator. The piston 144 is sealed with respect to the bore 146 at 152 so as to provide a seal between the control chamber 150 and the outlet chamber 136.

The piston 144 includes a portion of increased diameter which defines a pressure responsive member 154 which divides the control chamber into a first side 156 and a second side 158. The pressure responsive member 154 is sealed about its periphery 160 with respect to the counter bore 148 to provide a pressure seal between the first and second sides of the pressure responsive member while remaining slidable with respect to the housing. Pressure is controlled in the control chamber on the first side of the pressure responsive member for controlling the position of the piston and the pressure reducing valve 138 coupled thereto.

A port 162 extending through the piston 144 connects the outlet chamber 136 to the second side 158 of the pressure responsive member 154. The port 162 ensures that the back pressure on the second side of the pressure responsive member is substantially equal and balanced with the actual gas pressure at the outlet of the housing.

A spring 164 is mounted on the second side of the pressure responsive member 154 to act in a direction corresponding to urging the pressure reducing valve head 142 to engage the valve seat 140 in a closed position of the pressure reducing valve 138. The spring 164 thus acts to displace the pressure responsive member 154 in the same direction as the back pressure on the second side 158 so as to be substantially balanced with the control pressure within the control chamber 150 on the first side 156 of the pressure responsive member.

The spring is selected so as to permit a large pressure differential between the control pressure on the first side of the pressure responsive member and the outlet pressure on the second side of the pressure responsive member. The large pressure differential allows for rapid response time when venting the control pressure on the first side of the control chamber to the outlet chamber of the housing.

The control pressure in the control chamber 150 is controlled by a control port 166 which is coupled to the chamber on the first side 156 of the pressure responsive member. The control port 166 connects the control chamber 150 to a feed valve 168 and a bleed valve 170.

The feed valve 168 includes a feed valve head 172 which is movable with respect to a feed valve seat 174 between an open state in which the valve is fully opened and a closed state in which the valve is fully closed. Similarly the bleed valve 170 includes a bleed valve head 176 which is movable with respect to a bleed valve seat 178 between an open state in which the valve is fully opened and a closed state in which the valve is fully closed. The feed valve 168 and the bleed valve 170 are linked for operation together between a feed position in which the feed valve is in the open state and the bleed valve is in the closed state and an alternative bleed position in which the bleed valve is in the open state and the feed valve is in the closed state.

Similarly to the previous embodiments, the feed valve is coupled at an inlet to the inlet chamber 132 and at an outlet to the control port 166 of the control chamber, while the bleed valve is connected at an inlet to the control port 166 of the control chamber and at an outlet to the gas outlet 134 of the housing. In the feed position, pressurised gas is thus supplied through the control port 166 from the inlet chamber 132 to the control chamber 150 on the second side of the pressure responsive member 154. The increase in pressure acts to open the pressure reducing valve.

Alternatively in the bleed position pressurised gas from the inlet chamber 132 is prevented from entering the control port 166 and the control pressure in the control chamber 150 is thus vented through the control port 166 and subsequently through a bleed port 180 coupling the bleed valve 170 to the outlet chamber 136 of the housing. This acts to close the pressure reducing valve. A large pressure differential between the control pressure in the control chamber and the actual pressure at the outlet of the housing 128 ensures rapid response when venting.

The feed valve 168 and the bleed valve 170 are coupled together by an actuator rod 182 which connects the valves to a high speed solenoid operating mechanism 184. The solenoid operating mechanism 184 is operated by the processor 126 as described in the previous embodiments using a square wave signal that is pulse width modulated and/or frequency modulated to provide the desired control pressure in the control chamber 150 to consequently provide the desired output pressure as detected by the pressure sensor 124 (as shown in FIG. 3).

A set point 186 is input into the processor 126 to represent the desired output pressure from the regulator. The set point may be varied electronically to meet the demands of the gas using device 118 through a range of performance conditions. The processor 126 uses a proportional integral and derivative control algorithm to control operation of the solenoid operating mechanism 184 in accordance with the set point 186.

When installing the gaseous fuel system 110 in an existing vehicle equipped for operation with conventional gasoline fuel, the pressure supplied to the metering system may be modified by modifying the set point as a means for controlling the amount of fuel injected into the engine, in addition to pulse width modulation, to extend the dynamic range of the injectors of the metering system.

The particular arrangement of the regulator in FIG. 4 also acts as a shut off valve when the solenoid operating mechanism 184 is deactivated. Upon deactivation of the solenoid operating mechanism, the feed and bleed valves are displaced into the bleed position thus venting the controlled pressure on the first side of the control chamber 150 to the gas outlet 134 of the housing 128 such that the control pressure on the first side of the pressure responsive member and the back pressure on the second side of the pressure responsive member are both balanced with the actual gas pressure at the gas outlet 134. The spring 164 thus closes the pressure reducing valve 138. The regulator may further be used as an integral shut off valve mounted directly on a tank of pressurized gas by selectively deactivating the solenoid operating mechanism 184 when it is desired to shut off supply from the tank.

A high pressure lock-off solenoid 190 is provided, similarly to the previous embodiments, coupled between the supply 112 and the inlet of the regulator housing 128. The high pressure lock-off solenoid 190 ensures that gaseous fuel is not leaked through the regulator housing 128 when the regulator and gas using device are intended to be shut-off as described in the previous embodiments.

The regulator housing 128 may further include a pressure relief valve to relieve excess pressure in the event that one of the operating elements or valves of the regulator fails.

The electronic regulator described herein provides a means of controlling pressures of gaseous fuels being delivered to a gas using device such as a fuel cell or an internal combustion engine. The regulator is capable of providing improved pressure control for dynamic gas flow typically ranging from 0 to 20 g/s. The system has been designed so that fuel is not bled or purged to the atmosphere in normal operation. Further, the regulator has been designed such that a spring closes the pressure reducing valve when the system is de-energized. As well, additional safety is provided by a high pressure lock-off solenoid that shuts off the gas supply to the regulator system when the electronic controller de-energizes the lock-off solenoid.

The primary function of the controller, which includes a microprocessor containing embedded software, is to control the outlet pressure to a pre-programmed set point or set function. The microprocessor controls on-board electronic driver circuitry which in turn controls the 12 volt high speed solenoid operating mechanism which operates the feed and bleed valves. The pulse width or energized time of the solenoid operating mechanism is controlled by the microprocessor using PID control and feedback from the downstream pressure transducer. The high speed solenoid of the solenoid operating mechanism may be frequency modulated or pulsewidth modulated to vary the ratio of energized time to de-energized time which in turn has a direct relationship on the feed to bleed ratio, thus allowing the pressure within the control volume to be manipulated resulting in a change in force on the piston/valve causing movement against the counter spring to reestablish the static force balance on the piston/valve unit. This movement of the piston/valve assembly is manipulated to maintain the desired output pressure despite variations in fuel demand and supply pressure.

Method of Analysis

Performance Parameters

Tests were conducted to compare the performance of the electronic regulator with a single-stage mechanical regulator for a natural gas vehicle (NGV) fuel system. The tests were also conducted using a two-stage mechanical regulator, but those results are not included here for the sake of simplicity. The results for the two stage mechanical regulator were sufficiently similar to those for the single stage regulator that they are not considered necessary for a complete understanding of the present invention. Each regulator was set up on a test bench and tests were conducted to evaluate the following parameters:

Dynamic droop: This is defined as the decrease in regulator outlet pressure as a function of increasing flow rate. It is due primarily to the change in spring force as the valve moves away from the seat, but it is also due in part to pressure drop after the seat. For the purposes of this comparison droop was defined at a maximum air flow rate of 20 g/s.

Inlet pressure effect: Supply pressures in NGVs decrease from 3600 to 150 psig as the vehicle consumes the stored natural gas. The inlet or supply pressure effect is the variation of outlet pressure as a function of supply pressure. This is typically due to inlet pressure forces on the pressure reducing valve that change the force balance on the valve assembly. It is quoted in units of psig/1000 psig of supply pressure.

Hysteresis: Hysteresis is caused by friction and can be difficult to eliminate. As the flow rate increases the outlet pressure decreases or droops along a certain trajectory or path; however, the pressure follows a different path when the flow decreases. The difference between the two outlet pressure paths is called the hysteresis. It appears that the friction of the diaphragm pintle assembly (or o-ring on a piston-type regulator) is different depending on whether the valve is opening or closing.

Cracking droop: Cracking droop is the difference between the static pressure and the flowing pressure.

Cyclic variations: This is an indication of the fluctuations or (noise) in outlet pressure. For the electronic regulator it can be caused by the opening and closing of the pilot valve. For mechanical regulators it can be cause by cycling of the fluid dynamic system consisting of the spring, valve, and diaphragm.

Maximum error: This is defined as the overall error of the regulator over an air flow rate of up to 20 g/s and a tank pressure decreasing from 3000 psig to zero. It includes droop, hysteresis, and inlet pressure effect and is calculated from the following formula:

$$\text{Maximum Error} = \text{Droop} + \text{Hysteresis}/2 + \text{Inlet Pressure Effect} \times 3000/1000 \quad (1)$$

One-half the hysteresis is assumed because it is assumed that the regulator starts out at the average set-point pressure (as defined below).

Average set-point pressure: For the purpose of estimating the percent maximum error, average set-point pressure was defined as the average of the outlet pressure before and after the test.

Percent maximum total error:

$$\text{Percent Maximum Error} = \text{Maximum Error}/(\text{Average Set-Point Pressure} + 14.7) \quad (2)$$

It is usually possible to compensate for regulator droop in the calibration tables in the power train control module. However, it is difficult to compensate for hysteresis which results from changes due to friction.

After bench testing, the electronic regulator was installed in a pickup truck equipped with a fuel injected NGV conversion system. The regulator replaced the single stage mechanical regulator and was tested on a chassis dynamometer. Instrumentation was installed to measure pressure and flow rate.

Experimental Procedure

Two tests using air as a test gas were conducted on a single stage mechanical regulator and a regulator according to the present invention as described in the following.

1) A flow test was conducted to determine the change in the outlet pressure as a function of a change in flow rate.

2) An inlet pressure test was conducted to determine the change in outlet pressure as a function of a change in inlet (supply) pressure.

The intent of the initial test is to determine the error in pressure that can occur at different flow rates as engine operation changes from idle to wide open throttle. The second test evaluates the change in regulator pressure as the tank pressure decreases from full to empty.

Procedure for Flow Test

1) The supply pressure was set at 1000 psig.

2) The regulator pressure was set at 100 psig at a 1 g/s flow rate.

3) A needle valve controlling the outlet flow was turned off and the flow rate reduced to zero.

4) The flow rate was increased in a ramp by slowly opening the needle valve, increasing the flow rate from zero to 20 g/s over 50 seconds, then the needle valve was closed slowly decreasing the flow rate back to zero over 50 seconds.

5) The supply pressure was kept constant during the tests by adjusting a high-pressure regulator on the air supply cylinders.

6) Data for supply pressure, outlet pressure, and flow rate were recorded on a Campbell Scientific data logger.

7) Graphs were produced that plotted outlet pressure and flow rate versus time and outlet pressure versus flow rate.

8) Dynamic droop, hysteresis, and cracking droop were scaled from the plots.

Procedure for Inlet Pressure Test

1) The regulator pressure was set at 100 psig at 1 g/s flow rate.

2) The regulator supply pressure was set to zero.

3) The tank pressure was increased in a ramp from zero to 2 100 psig over a 70 second period, then it was decreased from 2 100 psig to zero over 70 seconds.

4) Data for supply pressure, outlet pressure, and flow rate were recorded on a Campbell Scientific data logger.

5) The data was displayed in a spread sheet and a graph was produced that plotted outlet pressure versus inlet pressure.

6) The change in outlet pressure due to the change in inlet pressure was scaled from the plots.

Analysis of Results

Dynamic Droop

FIGS. 5 and 6 compare the dynamic droop as a function of time and flow rate for the single stage mechanical regulator and the electronic regulator. The results for air flow rates of 20 and 10 g/s, which were scaled from FIGS. 7 and 8, are summarized in Table 2. The calculation is based on the average change in pressure, neglecting the hysteresis. For example, the mechanical regulator has a droop of 22 psig (98 psig–76 psig) for increasing flow and 20 psig (103 psig–83 psig) for decreasing flow. Hence, the average droop is 21 psig. Values are also shown for a flow rate of 10 g/s.

TABLE 2

Dynamic Droop Comparison

| Regulator | Mechanical (psig) | Electronic (psig) |
|---|---|---|
| at 20 g/s | 21 | 2 |
| at 10 g/s | 6 | 1 |

Note that these results are for a test setup with a prototype electronic regulator. It is believed that the droop in the electronic regulator could be reduced even further in an optimized design with shorter line lengths and a higher control pressure. As well, the noisy outlet pressure shown in FIGS. 6 and 8 appears to be a characteristic of the single valve design (FIG. 1) that may not exist with dual valves (FIG. 2). In actual use the noise may be over shadowed by the noise from fuel injectors.

Hysteresis

FIGS. 7 and 8 were used to calculate the hysteresis for the mechanical and electronic regulators. It was calculated by scaling the difference in the outlet pressure curves at 5 g/s intervals for flow rate increasing and decreasing. The average of five points from 0 to 20 g/s was taken as the droop for the test. For example, the hysteresis for the mechanical regulator at 0, 5, 10, 15, and 20 g/s are respectively 5, 6, 7, 7, and 6 psig. And the average is 6.2 psig. The results are summarized in Table 3. Regarding the electronic regulator, the outlet pressure is noisy as shown in FIG. 8, but the hysteresis is essentially zero.

TABLE 3

Hysteresis Comparison

| Regulator | Single-Stage | Electronic |
|---|---|---|
| Hysteresis (psig) | 6.2 | 0 |

Cracking Droop

Cracking droop was scaled from FIGS. 7 and 8. For the mechanical regulator the static pressure is 104 psig as shown in FIG. 7; however, as soon as the flow starts the pressure reduces to 98 psig; hence, the cracking droop is 6 psig. The results are summarized in Table 4. Note that the cracking droop for the electronic regulator is somewhat undefined since it is over shadowed by cyclic variations of the outlet pressure.

TABLE 4

Cracking Droop Comparison

| Regulator | Single-Stage | Electronic |
|---|---|---|
| Cracking Droop (psig) | 4 | 1 |

Cyclic Fluctuations

Cyclic variations were estimated from FIGS. 7 and 8. These figures provide the best representation of the pressure variation as a function of flow rate. The results shown in Table 5 represent the noise in the outlet pressure as the flow rate is increased then decreased. A range is presented because it is difficult to establish a representative value. Cyclic variations for the mechanical regulators may be due to the spring, mass, damper effect in the fluid control system. The control chamber or "dome" of the electronic regulator is either being fed or bled at all times which results in the variability in the control pressure, and consequently the variability in the outlet pressure. The amplitude of this cyclic behaviour may be reduced through optimizing controller gains and filtering the noise in the outlet hose.

TABLE 5

Limit-Cycle Fluctuations (psig)

| Regulator | Single-Stage | Electronic |
|---|---|---|
| Limit Cycle | ±0.5 to ±1 | ±1.5 to ±5 |

Note that statistical analysis of the pressure noise is not warranted because it is overwhelmed by the pressure fluctuations created by the fuel injectors.

Inlet Pressure Effect

The change in outlet pressure due to changes in inlet pressure was estimated from FIGS. 9 and 10 for the single-stage and electronic regulators respectively. Only the pressure decreasing part of each test was used to determine the inlet pressure effect. It was estimated on a per 1000 psig basis since the tests were done over the range of 0 to 2400 psig. Hence, an extrapolation is required for higher pressures (3600 psig). FIG. 9 shows a very small inlet pressure effect for the single-stage regulator as the pressure is increased; however, as the inlet pressure is decreased from 2400 psig to 150 psig the inlet pressure drops from 102.5 psig to 97.5 psig. The result is an inlet pressure effect of 2.6 psig/1000 psig ((102.5−97.5)/(2100−150)×1000) as shown in Table 6.

TABLE 6

Inlet Pressure Effect Comparison (psig/1000 psig inlet)

| Regulator | Single-Stage | Electronic |
|---|---|---|
| Variance | 2.6 | 0.9 |

Maximum Regulation Error

The maximum pressure error that might be realized in a vehicle is a function of the dynamic droop at 20 g/s, the hysteresis, and the tank pressure effect. Cyclic variations are ignored because they will be over shadowed by the pressure fluctuations caused by the fuel injectors (as mentioned later). Cracking droop for the mechanical and electronic regulators is ignored as well since this error only occurs only when a vehicle is started. As well, the transient error exhibited by the electronic regulator on a fuel flow decrease is ignored since it can be corrected. Equations 1 and 2 were used to calculate the maximum error and the percent maximum error; the results are summarized in Table 7.

TABLE 7

Total Regulator Error

| Regulator | Single-Stage | Electronic |
|---|---|---|
| Maximum Error (psig) | 32 | 5 |
| Percent Maximum Error | 28 | 4 |

Vehicle Testing

The prototype electronic regulator was installed in a 1992 GM pickup truck with a 5.0-L engine, replacing the regulator in a natural gas fuel-injection conversion system. The vehicle was installed on a chassis dynamometer and driven through two test cycles: a maximum power test at wide-open throttle (WOT), and the Hot 505 part of the Federal Test Procedure (FTP-75) used to evaluate tailpipe emissions. The vehicle worked very well with the electronic regulator. FIGS. 11 and 12 compare the results from the electronic regulator to results from a single-stage mechanical regulator. Note that the cyclic fluctuations for the electronic regulator and mechanical regulator are about the same in magnitude and frequency. It appears that the fluctuations caused by the fuel injectors over shadow the regulator fluctuations.

For the WOT test, the natural gas flow rate is shown increasing from 0.2 to 7 g/s. The outlet pressures from the mechanical regulator and electronic regulator are plotted on the same scale. The mechanical regulator has a droop ranging from about 3 to 7 psig while the electronic regulator has a droop of less than 2 psig.

The flow rate in the Hot 505 test, which ranges from about 0. 1 to 3 g/s, represents a combination of speed and load as the vehicle is accelerated and decelerated on the dynamometer. The mechanical regulator shows a droop of about 3 psig during transients while the electronic regulator shows essentially zero droop.

The present invention thus provides an electronic regulator for NGV applications that is more accurate than mechanical regulators. In preferred embodiments it has the capability to set the outlet pressure on-line. The maximum error in the prototype electronic regulator is 4%, compared to a two-stage mechanical regulator at 18%, and a single-stage mechanical regulator at 28%. This should have a significant effect on the performance and emissions of natural gas vehicles.

Chassis dynamometer tests in a GM pickup truck showed that the electronic regulator worked well, improving accuracy over the mechanical regulator. The tests showed that droop can be reduced to zero in the Hot 505 driving cycle.

Bench tests demonstrate that the outlet pressure can be varied dynamically in response to given input parameters or based on elapsed time. An example is shown in FIG. 13 in which the output pressure follows a pre-programmed ramp output.

What is claimed is:

1. A gas pressure regulator for regulating the pressure of a gas flowing from a source of the gas under pressure to a device for using the gas, the regulator comprising:
   a regulator housing having a gas inlet for receiving the gas and a gas outlet for the delivery of the gas from the housing;
   a pressure reducing valve in the housing for controlling the flow of gas from the inlet to the outlet;
   a pressure reducing valve controller comprising:
      a control chamber;
      a feed valve having an inlet coupled to the ass inlet for receiving gas from said source of gas under pressure and a control pressure outlet coupled to the control chamber, the feed valve having an open state in which the valve is fully open and and gas from the source of gas under pressure is received in the control chamber a closed state in which the valve is fully closed;
      a bleed valve having an inlet coupled to the control chamber and an outlet coupled to the gas outlet of the regulator housing, the bleed valve having an open state in which the valve is fully open and gas is vented from the control chamber to the ass outlet and a closed state in which the valve is fully closed, wherein the bleed valve only vents gas under pressure externally from the housing to the gas outlet;
      a high speed solenoid valve actuator for operating the feed and bleed valves;
      a pressure responsive member in the control chamber and coupled to the pressure reducing valve for movement therewith, the pressure responsive member being movable in response to variations in a control pressure in the control chamber on a first side of the pressure responsive member with which the feed and bleed valves each communicate opposite a second side of the pressure responsive member in communication with the ass outlet of the regulator housing such that back pressure in the control chamber on the second side of the pressure responsive member is substantially maintained at an actual gas pressure at the gas outlet of the regulator housing;
      a biasing mechanism acting on the pressure responsive member through a range of motion of the pressure responsive member in a direction corresponding to pressure acting on the second side of the pressure responsive member such that said pressure acting on the second side of the pressure responsive member and force of the biasing mechanism balance with pressure acting on a first side of the pressure responsive member for maintaining a substantially greater pressure on the first side than on a second side of the pressure responsive member;
      a pressure monitor for monitoring an actual gas pressure at the gas outlet of the regulator housing;
      a controller having a set point pressure and being coupled to the pressure monitor and to the solenoid valve actuator for controlling operation of the feed valve in communication with the source of gas under pressure and the bleed valve in communication for venting to the gas outlet between their respective closed and open states in response to variation of the actual gas pressure at the gas outlet from the set point pressure such that the actual gas pressure at the gas outlet of the regulator housing is substantially maintained at the set point pressure.

2. A gas pressure regulator according to claim 1 wherein the controller comprises a mechanism for controllably varying the set point pressure.

3. A gas pressure regulator according to claim 1 wherein the controller includes a signal generating mechanism for delivering a pulsed electrical signal for operating the feed and bleed valves and a signal varying mechanism for controllably varying the pulse width of the electrical signal.

4. A gas pressure regulator according to claim 1 wherein the high speed solenoid valve actuator includes a pressure reducing valve closing mechanism for closing the pressure reducing valve in response to deactivation of the high speed solenoid valve actuator.

5. A gas pressure regulator according to claim 1 wherein the feed and bleed valves are coupled for movement together between a bleed position in which the bleed valve is in the open state and the feed valve is in the closed state and a feed position in which the feed valve is in the open state and the bleed valve is in the closed state.

6. A gas pressure regulator according to claim 5 wherein the high speed solenoid valve actuator comprises a single solenoid coupled to the feed and bleed valves, the feed and bleed valves being positioned in the bleed position upon deactivation of the single solenoid.

7. A gas pressure regulator according to claim 1 wherein there is provided a shut-off valve coupled to the gas inlet of the regulator housing, the shut-off valve being arranged to be closed in response to a shut-off condition sensed by the pressure monitor.

8. A gas pressure regulator according to claim 7 wherein the shut-off valve includes a solenoid operating mechanism for displacing the valve between respective open and closed positions, the solenoid operating mechanism being oriented in the closed position when deactivated.

9. A gas pressure regulator according to claim 1 in combination with the source of gas under pressure and the device for using the gas wherein the supply of pressurised gas is mounted remotely from the gas using device, coupled by a gas line and wherein the gas pressure regulator is mounted adjacent the supply of pressurised gas.

10. A gas pressure regulator according to claim 1 in combination with the source of gas under pressure and the device for using the gas wherein the pressure monitor is coupled to the gas line adjacent the gas using device.

11. A gas pressure regulator according to claim 1 in combination with the source of gas under pressure and the device for using the gas wherein the gas using device comprises an internal combustion engine.

12. A gas pressure regulator according to claim 1 in combination with the source of gas under pressure and the device for using the gas wherein the gas using device comprises a fuel cell powered engine.

13. A method of regulating pressure of a gas flowing from a source under pressure to a device for using the gas, the method comprising:

providing a regulator housing having a gas inlet, a gas outlet and a pressure reducing valve for controlling the flow of gas from the inlet to the outlet;

connecting the gas inlet in communication with the source under pressure;

connecting the gas outlet in communication the device for using the gas;

providing a pressure reducing valve controller having a control chamber, a feed valve and a bleed valve, each of the feed and bleed valves having an open state in which the valve is fully open and a closed state in which the valve is fully closed;

connecting the feed valve to the source under pressure at an inlet of the feed valve and to the control chamber at an outlet of the feed valve such that gas is fed from the source to the control chamber when the feed valve is opened;

connecting the bleed valve to the control chamber at an inlet of the bleed valve and to the gas outlet of the regulator housing at an outlet of the bleed valve such that gas is only vented from the control chamber to the gas outlet when the bleed valve is opened;

providing a pressure responsive member in the control chamber;

coupling the pressure responsive member to the pressure reducing valve for movement therewith in response to variations in control pressure in the control chamber acting on a first side of the pressure responsive member with which the feed and bleed valves each communicate;

coupling the control chamber at a second side of the pressure responsive member, opposite the first side, to the ass outlet such that back pressure in the control chamber on the second side of the pressure responsive member is substantially maintained at an actual ass pressure at the gas outlet;

providing a biasing mechanism acting on the pressure responsive member through a range of motion of the pressure responsive member in a direction corresponding to pressure acting on the second side of the pressure responsive member such that said pressure acting on the second side of the pressure responsive member and force of the biasing mechanism balance with pressure acting on a first side of the pressure responsive member;

maintaining a substantially greater pressure on the first side than on a second side of the pressure responsive member;

monitoring an actual gas pressure at the gas outlet of the regulator housing; and controlling, in response to the actual gas pressure monitored, operation of the feed valve in communication with the source of gas under pressure and bleed valve in communication for venting to the gas outlet between their respective closed and open states in response to variation of the actual gas pressure at the gas outlet from a set point pressure such that the actual gas pressure at the gas outlet of the regulator housing is substantially maintained at the set point pressure.

14. The method according to claim 13 including operating the feed and bleed valves together between a bleed position in which the bleed valve is in the open state and the feed valve is in the closed state and a feed position in which the feed valve is in the open state and the bleed valve is in the closed state.

15. The method according to claim 14 wherein the high speed solenoid valve actuator comprises a single solenoid coupled to the feed and bleed valves, the feed and bleed valves being positioned in the bleed position upon deactivation of the single solenoid.

* * * * *